(12) United States Patent
Mauro, II (10) Patent No.: US 8,499,171 B2
(45) Date of Patent: Jul. 30, 2013

(54) MOBILE SECURITY SYSTEM AND METHOD

(75) Inventor: Anthony Patrick Mauro, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/035,714

(22) Filed: Feb. 25, 2011

(65) Prior Publication Data

US 2011/0154032 A1 Jun. 23, 2011

Related U.S. Application Data

(62) Division of application No. 11/283,360, filed on Nov. 18, 2005, now Pat. No. 7,921,303.

(51) Int. Cl.
*G06F 11/30* (2006.01)
(52) U.S. Cl.
USPC .......................................................... 713/193
(58) Field of Classification Search
USPC ...................................... 713/165, 193; 726/4
See application file for complete search history.

(56) References Cited

U.S. PATENT DOCUMENTS

| | | | |
|---|---|---|---|
| 4,658,093 A | 4/1987 | Hellman | |
| 5,398,285 A | 3/1995 | Borgelt et al. | |
| 5,638,446 A | 6/1997 | Rubin | |
| 6,243,468 B1 | 6/2001 | Pearce et al. | |
| 6,510,236 B1 | 1/2003 | Crane et al. | |
| 6,711,684 B1 * | 3/2004 | Moroney et al. | 713/191 |
| 6,728,880 B1 * | 4/2004 | Sites | 713/178 |
| 6,931,545 B1 | 8/2005 | Ta et al. | |
| 7,921,303 B2 | 4/2011 | Mauro, II | |
| 8,041,957 B2 | 10/2011 | Michaelis et al. | |
| 2002/0001384 A1 | 1/2002 | Buer et al. | |
| 2002/0136401 A1 | 9/2002 | Hoffstein et al. | |
| 2002/0144052 A1 | 10/2002 | Yada et al. | |
| 2002/0150253 A1 | 10/2002 | Brezak et al. | |
| 2002/0198845 A1 | 12/2002 | Lao et al. | |
| 2003/0225960 A1 * | 12/2003 | Guu et al. | 711/103 |

(Continued)

FOREIGN PATENT DOCUMENTS

| | | |
|---|---|---|
| EP | 0809244 A2 | 11/1997 |
| GB | 2404263 A * | 1/2005 |

(Continued)

OTHER PUBLICATIONS

Bellare M., et al., "Keying Hash Functions for Message Authentication," Advances in Cryptology, Crypto 96 Procedings, Lecture Notes in Computer Science, vol. 1109, pp. 1-19 (Jun. 1996).

(Continued)

*Primary Examiner* — Samson Lemma
(74) *Attorney, Agent, or Firm* — Won Tae Kim (57) ABSTRACT

A system and method for providing a secure environment for mobile telephones and other devices are disclosed. The system and method may utilize trust zoning, layered memory, and a secure matrix model having, for example, a memory protection module for protecting memory; a secure debug module for ensuring security of the debug module; a secure file system module for protecting the secure file system; and a trusted time source module for protecting components. Embodiments of the present invention may protect against security attacks on a variety of hardware and software components while permitting suitable levels of accessibility for developmental and maintenance purposes.

27 Claims, 3 Drawing Sheets

U.S. PATENT DOCUMENTS

| | | |
|---|---|---|
| 2004/0123089 A1 | 6/2004 | Bodily |
| 2005/0018472 A1 | 1/2005 | Lim |
| 2005/0033959 A1 | 2/2005 | Zheng et al. |
| 2005/0091520 A1* | 4/2005 | Khan et al. .................... 713/194 |
| 2005/0138409 A1* | 6/2005 | Sheriff et al. ................. 713/200 |
| 2005/0238325 A1 | 10/2005 | Tanabe et al. |
| 2006/0210082 A1* | 9/2006 | Devadas et al. ............... 380/277 |
| 2007/0172064 A1 | 7/2007 | Nonaka et al. |

FOREIGN PATENT DOCUMENTS

| | | | |
|---|---|---|---|
| GB | 2405007 A | * | 2/2005 |
| JP | 63257843 A | | 10/1988 |
| JP | 1288943 A | | 11/1989 |
| JP | 4167145 A | | 6/1992 |
| JP | 10083297 | | 3/1998 |
| JP | 10301773 | | 11/1998 |
| JP | 10311773 | | 11/1998 |
| JP | 11345117 | | 12/1999 |
| JP | 2000122930 A | | 4/2000 |
| JP | 2001216042 | | 8/2001 |
| JP | 2001243062 | | 9/2001 |
| JP | 200223876 | | 1/2002 |
| JP | 2002297561 A | | 10/2002 |
| JP | 2002312052 | | 10/2002 |
| JP | 200384984 | | 3/2003 |
| JP | 2004030551 A | | 1/2004 |
| JP | 2004206715 A | | 7/2004 |
| JP | 2005500608 | | 1/2005 |
| JP | 2005033778 A | | 2/2005 |
| JP | 2005122474 A | | 5/2005 |
| JP | 2005301634 A | | 10/2005 |
| JP | 2005502128 | | 1/2010 |
| WO | WO9608092 | | 3/1996 |
| WO | WO9915947 | | 4/1999 |
| WO | WO0075759 A1 | | 12/2000 |
| WO | WO0219598 | | 3/2002 |
| WO | WO03017682 | | 2/2003 |
| WO | WO03021467 | | 3/2003 |
| WO | WO2004075525 A1 | | 9/2004 |
| WO | WO2005085975 A1 | | 9/2005 |

OTHER PUBLICATIONS

Cryptographic Message Syntax Standard, RSA Laboratories Technicol Note, Version 1.5, Revised Nov. 1, 1993.
Federal Information Processing Standard (FIPS) Pub 180-1, Secure Hash Standard, Apr. 17, 1995.
Federal Information Processing Standard (FIPS) Pub 186, "Digital Signature Standard (DSS)," May 19, 1994.
FIPS PUB 198, "The Keyed-Hash Message Authentication Code (HMAC)", http://csrc.nist.gov/publications/fips/fips198/fips-198a.pdf, Mar. 6, 2002. Management in a 3G mobile phone and beyond, ACM Workshop on Digital Rights.
Gralla, P. "How the Internet Works" Que, 2001, 6th Edition, USA, pp. 303-307.
HMAC: Keyed Hashing for Message Authentication; H. Drawczyk, et al., Network Working Group, Request for Comments: 2104; Category: Informational, Feb. 1997.
International Search Report & Written Opinion—PCT/US2006/045030, International Search Authority—European Patent Office—Jun. 26, 2007.
Menezes, Oorschot, Vanstone: "Handbook of Applied Cryptograhy" CRC Series on Discrete Mathematics and Its Applications, 1997, pp. 555-556, 559-560, 39, XP002521729.
Message Authentication Using Hash Functions—The HMAC Construction, Mihir, et al., RSA Laboratories Cryptobytes, vo. 2, No. 1, Spring 1996.
RFC 2459, "Internet X.509 Public Key Infrastructure Certificate and CFL Profile," Housley, et al., Jan. 1999.
Rivest: "The MD5 Message-Digest Algorithm," RFC 1321, The Internet Engineering Task Force (IETF) Request for Comments, Network Working Group, MIT Laboratory for Computer Science and RSA Data Security, Inc., pp. 1-20, Apr. 1992.

* cited by examiner

MOBILE SECURITY SYSTEM AND METHOD

The present application for patent is a Divisional of prior application Ser. No. 11/283,360 entitled "Mobile Security System and Method" filed Nov. 18, 2005, now allowed, and assigned to the assignee hereof and hereby expressly incorporated by reference herein.

BACKGROUND

The present invention generally relates to mobile devices such as mobile telephones. More particularly, this invention relates to security systems and methods for mobile devices and other communication devices.

Current technology provides for communications between a plethora of devices via a variety of communication media. For example, computers routinely communicate via the Internet. Mobile devices such as mobile telephones and personal digital assistants (PDAs) are used to communicate with a variety of devices via wireless, analog, digital and other means. Mobile devices may be used, for example, to communicate with other mobile units, computer systems and networks, analog telephone systems and other devices.

The connectivity and functionality of mobile devices provide a broad venue for multimedia, multifunctional use. For example, a mobile telephone is commonly used to communicate with other mobile (wireless) telephones and analog telephones; to download and run game packs; to download and play music; to download and view video; to perform commercial transactions (m-commerce) such as buying and selling products using electronic payment methods; as cameras; to transmit all variety of data and information to other devices; and to run applications such as calendaring and address applications, electronic wallet software, and more.

Innate to the functionality of a mobile telephone, however, is the significant opportunity for intentional security breaches, with significant adverse effects. For example, identity theft (theft of personal information used for fraudulent and criminal purposes) is currently one of the fastest growing crimes, with an estimated associated cost of $1.5 billion annually.

Software piracy (illegal theft or copying of software) is currently estimated to result in annual losses of around $13 billion. Statistically, one in every three software applications will be pirated. Content theft, such as the theft and redistribution of movies or music, results in losses of $3 billion in theft of analog content alone. Theft of digital content is estimated at 350,000 illegal copies of movies alone per day. Further to the tangible losses, the intangible considerations are enormous. For example, device manufacturers may face potential liability for security breaches; potential exclusion from market segments; and damage to investor and business relationships.

Such breathes are accomplished via various means and via various hardware, software, and communications components and channels. For example, simple measures taken to exploit vulnerabilities include packet forging or spoofing at the network level. Other means range from stealth diagnostics, sniffers, hijacking sessions, and back door attacks to self-replicating code. For any single hardware component, software component, or communication link currently in use today, there are at least one—if not many—means to compromise the device, the code, the associated information, or a combination of the same.

Such attack models include, for example, modem misuse, identity theft, and digital rights management (DRM) violations. In devices relying on modems for communication, a user may inadvertently download an application containing malicious code. The code executes, reconfiguring the memory management units (MMUs), which, in turn, permits the code to take control of the hardware components for its own purposes.

In the attack model of identity theft, a user's private information such as a private key, user name, and password is extracted from their mobile telephone. The information is then used to pass secure authentication systems, permitting misuse. For example, stolen information may be used to electronically gain access to a credit account and complete buying transactions charged against the account.

The attack model for digital rights management, or violations of transactions that involve downloading multimedia content such as music, requesting a license to use the content, authenticating the request, and purchasing the license, is frequently employed to defraud the owner of the intellectual property interests in the content. For example, after securing a license for use of an MP3 file on a single device, the licensee may "superdistribute" the file to multiple devices without renegotiating the license, thus mulcting significant use without payment of licensing fees or royalties to the content owner.

Furthermore, attempts to address security issues have, in the past, resulted in new adverse issues. Software solutions still have high potential for security holes. Software solutions are also very difficult to validate. Debugging operations and security are orthogonal concepts. Physical separation between trusted and non-trusted (vulnerable) components offers some protection. For example, hardware components such as microchip sets—such as those used in PC platforms—may have embedded, immutable security modules. Such "secure domains", however, are virtually impossible to increase without hardware changes. Thus, wholesale purchasers of such manufactured devices may settle for the features and functionality initially provided in the chip by the manufacturer. This is not a viable solution for chip manufacturers and other providers that provide a product line to vendors. Vendors may have the ability to access the embedded operating system and other code to enable compatibility and functionality between the chip and the vendor's hardware. Such access, however, may be misused to infiltrate the system and controvert its intended purpose. A prevalent example of this is mobile telephones. The manufacturers may forego embedded security options to permit vendors access to the chip and other components for customization purposes. After customization and sale to a retailer or customer (user) of the device, any number of parties may gain unauthorized access to various components of the mobile telephone with catastrophic results. For example, the dynamic environment in which a mobile telephone operates permits the download of third party applications to mobile telephones. An attack may be carried out in the form of such a download, whereafter the application gains control of the power amplifier and the radio frequency communications between the host (mobile telephone) and other mobile telephones in the same city, potentially resulting in paralysis of an entire communication network within a given geographical region.

As can be seen, there is a need to secure all aspects related to the use of mobile devices. In particular, it is desirable to provide economical security systems and methods for mobile devices and for such systems and methods to permit authorized access to hardware and software components yet prevent security breaches.

SUMMARY

An aspect of the present invention may reside in a security system for a mobile device having a plurality of components including a secure file system, the security system comprising a plurality of modules, each module in the plurality of modules securing at least one component in the plurality of components, the plurality of modules including a secure file system module for protecting the secure file system, the secure file system module including a mobile device-specific hardware key, and an on-chip, non-volatile memory for storing the mobile device-specific hardware key.

These embodiments will become better understood with reference to the following drawings, description and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention may be applicable to a variety of computer devices and communication devices, including mobile telephones; personal digital assistants (PDAs); and other communication devices, including those using, exchanging, transmitting, or receiving, information in any form or format. Various embodiments of the present invention may be particularly applicable to computer or communication devices having a modem. The security features of embodiments of the present invention can inhibit a software-based or physical attack that would otherwise result in an attacker gaining some degree of control over modem functionality.

Embodiments of the present invention provide such improvements with use of a security matrix model and/or a trust zoning scheme having discrete security solutions that may be employed individually or in various combinations to thwart security breaches, as discussed more fully hereinafter. Used alone or in combination, each of the aforementioned solutions may act to protect modem operations; applications; security protocols; user authentication processes; and device authentication processes commonly used for standards-compliant radio operation; m-commerce transactions; and DRM-enabled applications and players. Used in various combinations, the aforementioned solutions provide a cohesive, efficient, and economical security solution for computer and communication devices.

By way of contrast, inventions of the prior art that attempt to secure communications and devices typically rely on a few isolated security implementations, if at all, such as trusted boots and random number generators. None of the prior art inventions, alone or in combination, provides a comprehensive security solution for a device or communication session. For example, a trusted boot solution provides security against infiltration of a mobile device during its boot sequence, but leaves the devices and communications thereto and therefrom vulnerable to attack while the device is in use. Random number generators increase the difficulty level for breaking certain codes or algorithms, but do not protect against infiltration of certain hardware components or unencrypted software, such as media content.

More specifically, embodiments of the present invention may utilize, inter ells, trust zoning principles and the security matrix module. The trust zoning concept may be elucidated as follows: trust zoning defines one or more zones relative to a computer device, communications device, or a communications environment; for example, a mobile telephone. Trust zones are formed by variable, predetermined logical boundaries, physical boundaries, or a combination of both, within a computer environment or a communication environment. The computer environment or communication environment may include communication or computer networks; groups of devices; individual devices; groups of components or modules within a device, or individual components or devices; or areas within an individual device or component (hereinafter, collectively referred to as "elements"). Each trust zone describes (bounds) a predetermined group of elements. Each trust zone provides a predetermined level of accessibility by trusted entities and non-trusted entities running in various modes to the elements within the trust zone. For example, trusted code may be permitted access to complete memory space while a third-party application may be restricted to discrete areas, or layers, of memory.

The layered memory concept includes types and areas of memory that are defined. Layers may or may not overlap, depending on functional objectives or other criteria. For example, within a device, memory may include the layers of system memory; peripheral memory; application digital signal processor (DSP) memory; and flash memory, for example NAND flash memory, a type of constantly-powered non-volatile memory that can be erased and reprogrammed in units of memory called blocks. Flash memory gets its name because the microchip is organized so that a section of memory cells are erased in a single action or "flash." The erasure is caused by Fowler-Nordheim tunneling in which electrons pierce through a thin, dielectric material to remove an electronic charge from a floating gate associated with each memory cell; for example, a NAND gate or a NOR gate.

Each layer may include nested layers; for example, peripheral memory may be defined as secure peripherals and non-secure peripherals. Associations between various layers and various trust zones are then established to optimize functionality and security.

Figure 1:
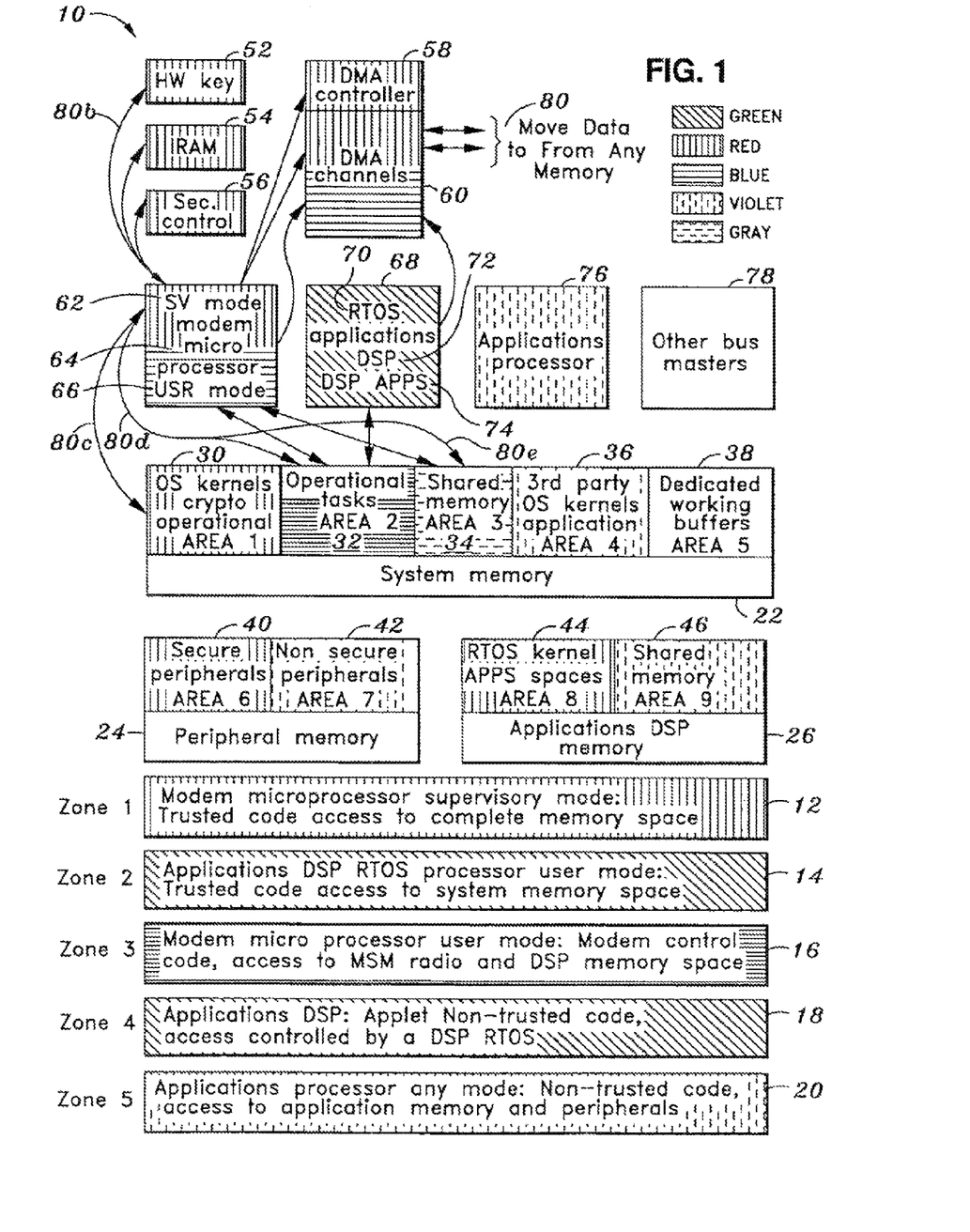
FIG. 1 illustrates a system-wide view of a memory protection module, according to an embodiment of the present invention.

Referring now to the drawings, wherein similar reference characters designate corresponding parts throughout the drawings, an example of memory protection utilizing trust zoning and memory layers according to an embodiment of the present invention is shown in FIG. 1. A system-wide view of a memory protection module is shown generally at 10. The memory protection module includes trust zones legend shown as Zones 1-5 and numbered as 12-20, respectively. The trust zone may be implemented according to the following predetermined definitions (ordered from greatest trust to least trust, in terms of entities and modes):

Zone 1: Modem resource manager (processor) Supervisory Mode: trusted code and access to complete memory space permitted;

Zone 2: Application digital signal processing (DSP) real time operating system (RTOS) mode: trusted code and access to system memory space permitted;

Zone 3: Modem automated resource manager (processor) user mode: modem control code, access to modem radio and DSP memory space permitted;

Zone 4: Applications DSP applet execution; non-trusted code permitted; access controlled by applications DSP RTOS (Zone 2); and Zone 5: Application processor any mode: non-trusted code access to application memory and peripherals permitted.

Zone 1 (12), for example, may be for completely trusted code and may be the smallest possible code size. It may execute core operating system functions and cryptography (crypto) operations involving the hardware key or private keys from the secure file system.

Zone 2 (14), for example, may be for completely trusted code and may control the access rights of individual applications DSP applets.

Zone 3 (16), for example, may permit trusted access to the radio control registers while in modem supervisory mode, and may contain all of the core control code such as Code Division Multiple Access (CDMA), global system for mobile communications (GSM); and universal mobile telecommunications service (UMTS).

Zone 4 (18), for example, may be trusted for certain address ranges depending on the applet. Zone 2 (RTOS) may be responsible for determining the access rights of Zone 4.

Zone 5 (20), for example, may be completely untrusted.

The memory protection model further may include memory layers of system memory 22; peripheral memory 24; and applications DSP memory 26. The layers of memory may be further subdivided into areas, as follows: system memory 22 comprises area 1 shown at 30 for the operating system (OS) kernel; area 2 shown at 32 for operational software tasks; area 3 shown at 34 for shared memory; area 4 shown at 36 for third-party application OS kernels and applications; and area 5 shown at 38 having dedicated working buffers. Peripheral memory 24 comprises area 6 shown at 40 for secure peripherals and area 7 shown at 42 for non-secure peripherals. The applications DSP memory 26 comprises area 8 shown at 44 for RTOS kernel applications and area 9 shown at 46 for shared memory.

The following data, controls, resource managers, channels, and modes typically used in mobile telephone communications and devices are considered in this example: a hardware key 52; modem processor secure scratch pad Memory (IRAM) 54; security control 56; direct memory access (DMA) control 58; DMA controller channels 60; supervisory mode 62; modem processor 64; user mode 66; control code 68; RTOS 70; applications DSP 72; DSP applications 74; application processor 76; and other bus masters 78.

The shades of color depicted for each zone 1-5 correlate to the shaded areas of respective zones of the depicted system. For example, the highly trusted areas of Zone 1 shown 12 include areas of the system such as the hardware key 52, IRAM 54, security control 56, supervisory mode 62, area 1 of system memory 22, and area 6 of peripheral memory 24. The aforementioned shading further correlates to the arrows between system components (as depicted in the legend 80), the arrows representing the channels in which data or code can be moved to or from areas of memory and relative to modes of operation. For example, the application processor 76 can move data or code such as third-party OS kernels and applications to and from area 4 shown at 36, the movement depicted by arrow 80a. In another example, a hardware key 52 may be moved in supervisory mode 62 (shown as arrow 80b) to areas 1, 2 or 3 (shown at 30, 32, and 34 respectively) of system memory 22 as depicted by arrows 80c, 80d, and 80e, respectively. In this particular embodiment, as shown in the foregoing example, components of a certain level of trust may access memory layers having the same level of trust or lower (less trusted zones).

Specific details of this embodiment include the following interrelationships. The application processor execution 76 is untrusted in any mode. Hence the application memory management units (MMU) settings are not trusted and no assumptions are made upon their configuration; i.e., the third-party OS can use the application MMU freely (area 4 at 36). The Modem processor supervisory mode execution 62, 64 is completely trusted, and hence the modem MMU is used to guard between individual operational software processes in area 2 at 32 and their access rights with the modem memory space. The applications DSP RTOS 70, 72 can execute any mix of trusted and non-trusted applets. To support individual access rights per applet the RTOS provides driver functionality to request memory transfers/accesses. The RTOS is trusted to identify access rights per applet and configure the assigned DMA controller channel's 60 MPU accordingly. Separate Memory Protection Units (MPUs) are used to protect Zones 1 to 4 from invalid accesses from other zones (such as one or more of Zones 3, 4 and 5) since the application MMU is not trusted.

With reference now to trust zone debug access relative to trust zoning, different levels of visibility into the memory-mapped domains are configurable at power up of the mobile telephone. The proper debug configuration is automatically derived from the content of on-chip non-volatile (NV) memory (fuses) or is established by a boot loader in read-only memory (ROM) according to certificate information of a secondary boot loader. The debug configuration derived from NV memory content is established immediately after power up and does not require the mobile telephone to actually boot in order to be enforced. The debug configuration established by software may override the initial non-volatile memory based configuration, if so desired.

For debugging purposes, various levels of users can be identified. For example, three levels of users may comprise an inventor developer, an original equipment manufacturer (OEM) developer, a third-party OS developer, and an end user/subscriber. The table below entitled "Example of Debug Access Rights" summarizes debug access rights afforded to each user, as shown for illustrative purposes.

Example of Debug Access Rights

| Debug User | Debug Rights | Access To Hardware Key |
|---|---|---|
| Inventor Developer | Full access | Yes (allow the key to be provisioned and verified) |
| OEM Developer | Application Processor Applications DSP Modem Processor in User mode only Utilize Test Interface Controller | No |
| Third-Party OS Developer | Applications DSP Application Processor | No |
| End User/ Subscriber | Application Processor | No |

For example, in various embodiments, after production the memory mapped domains are initially completely "open"; i.e., the fuse settings indicate debug access to all modes. At this time, it is also possible to directly access and to provision the device's hardware key 52. Access to full-chip scan chains and ability to directly scan out and to modify the value of the hardware key 52 may always be disabled before shipment to the OEMs. Once all modem supervisory mode code is shipped as object code and contains no direct modem control functionality, debug access to the modem processor in supervisory mode may also be disabled before shipment to the OEMs. Any modem debug functionality may be disabled upon product shipment. Thus it can be seen that maximum system configurability is provided during the design and implementation phases, while maximum security still applies to all system phases from design to use.

Figure 2:
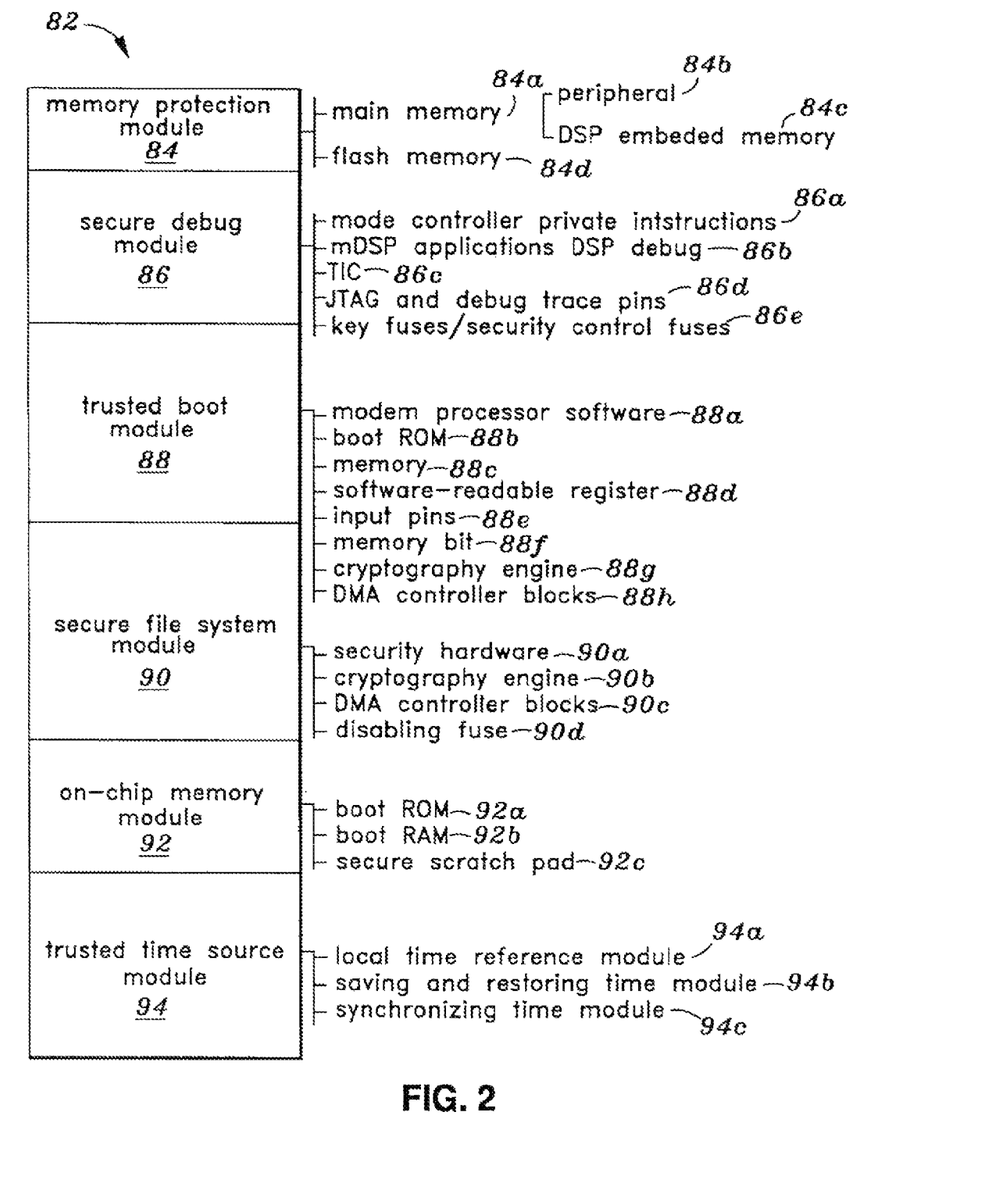
FIG. 2 illustrates a security matrix model, according to an embodiment of the present invention.

With reference to FIG. 2 and continuing reference to FIG. 1, there is shown generally at 82 the security matrix model. The model 82 may comprise any module, alone or in combination, which carries out the functionality described here. For example, various combinations of modules such as a memory protection module 84, a secure debug module 86, a trusted boot module 88, a secure file system module 90, an on-chip memory module 92, and a trusted time source module 94 may be found in various embodiments.

In various embodiments, for example, the memory protection module 84 may be necessary for meeting trust zoning security goals, and may be defined by trust zoning properties. The secure debug module 86 may insure FIPS 12 compliance, and may be implemented according to trust zone properties, as exemplified in the above table, entitled "Example of Debug Access Rights". The trusted boot module 88 may utilize, for example, strong protocols to ensure that a software image loaded during boot is an authentic image supplied by the OEM. The secure file system module 90 may use, for example, trusted software to encrypt sensitive data before storing it in external, non-volatile memory using a device-specific hardware key 52, thus preventing security breaches of multiple devices. The on-chip memory module 92 (embedded memory) may be used to provide, for example, storage for secret information such as cryptographic keys, thus preventing unauthorized access to such information via probes, for example. The trusted time source module 94 may be used, for example, to ensure timely expiration of time bound rights such as DRM content certificates and temporary debugging right certificates, thus preventing unauthorized possession or use of content or device components. These elements can be used alone or in any combination to provide security measures heretofore unknown in the art, as more fully described hereafter.

Memory Protection Module

The memory protection module 84 design may be associated with the trust zoning properties previously discussed, and may protect modem operation, DRM content, and m-commerce and other functions and components of various systems.

Various embodiments of the present invention may provide security for systems having independent memory spaces. In one example, a system may have two independent memory spaces, each of which can be accessed by both trusted and non-trusted entities (and thus require memory protection). The two independent memory spaces may comprise, for example, main memory space 84a, which may include peripheral 84b and DSP embedded memories 84c, and flash memory 84d; for example, NAND Flash memory. Memory spaces may be protected by defining and enforcing security partitions. Only trusted software, such as a modem processor operational software kernel and applications DSP RTOS, for example, associated with Zones 1 and 2 may be allowed to configure and modify memory protection configurations.

In various embodiments, the memory protection module 84 may protect main memory 84a, for example, via one or more combined actions associated with the following memory protection elements: a predetermined number of main memory protection units (MPU) blocks; for example, three; modem processor memory management unit (MMU); modem subsystem secure mode multiplexer (SMM) block; applications digital signal processor (applications DSP 72) MPU; DMA controller security features (embedded MPU, shadow registers, security identification (ID)); general purpose input/output expansion interface (GPIO) security features (shadow registers, bitmasks); and Main Memory MPU blocks.

The MPU blocks may monitor bus transaction requests and may block those request that violate security partition permissions. Multiple MPU blocks may be employed to monitor bus requests on multiple physical busses. In various embodiments, MPU blocks may be identical in design and differ only in the number of partitions each supports.

The modem processor MMU may enforce security partition permissions for modem processor memory accesses when, for example, the processor is in user mode, thus permitting main memory MPU to treat the processor as if it were running privileged-mode (trusted) software all the time.

The SMM may make MPU blocks completely inaccessible to any master, by for example, grounding a chip select signal for IRAM and SMC when TIC is enabled.

The applications DSP 72 MPU may prevent applications DSP applications, such as those Zone 4, from accessing various registers, thus the applications must issue RTOS system calls to perform memory access.

The DMA controller security features may ensure that trust zone memory protection requirements can be enforcement when DMA performs memory access on behalf of other components belonging to different trust zones.

The GPIO security features may enable configuration of a subset of channels accessible only by trusted zone masters.

In various embodiments, a main memory partition configuration may include, for example, a distributed mass storage system partition; a distributed mass storage system externalized state partition; at least one video frame buffer partition; at least one MDP partition; and at least one application digital signal processor partition.

In various embodiments, peripheral memory 24 configuration may include, for example, a DMA secure peripheral partition; a non-DMA secure peripheral partition; a GPIO shadow registers partition; DMA shadow register partitions; and applications DSP partitions.

In various embodiments, the memory protection module 84 may protect NAND Flash memory, which does not belong to the main memory map. A dedicated NAND MPU may be integrated a NAND controller. The NAND MPU block may utilize information parsed out from the NAND controller and NAND Flash operation commands to determine which NAND page will be accessed and the type of access. Based on this information, the NAND MPU may permit or may block the NAND Flash operation.

In various embodiments, NAND memory configuration may comprise an operational software partition and a read-only third party OS partition. The operational software partition may protect critical software and state information from corruption by non-trusted masters and may ensure that the device, such as a mobile telephone, cannot be permanently disabled with a software based attack that erases or otherwise compromises the code image and state/configuration information used during a boot process. The read-only third party OS partition may be used to store application executable image and other data that should be write-protected from malicious software.

In various embodiments, the MPU logic may rely on bus master identification information present in every bus request. For each bus request, the MPU may look up the set of permissions corresponding to both the target memory partition and the bus master originating the request.

Secure Debug Module

The secure debug module 86 may be used to ensure FIPS L2 compliance, and may also be guided by the trust zoning principles. Hardware-based control over all debug and fault-testing features may be required to enforce trust zone debug access rules. At the same time, it may also be required that the trusted software be able to override hardware secure debug settings and allow selected customers to have temporary access to debug features when such access may not be normally allowed by the trust model. Furthermore, it may be necessary to provide a mechanism to restore full access to all debug and fault-testing features in a device that may be returned, for example, to the original chip manufacturer. The latter requirement may be implemented such that the existing testing methodology may not be significantly altered. Finally, the secure debug model may be resistant to attack by taking advantage of the fact that the initial state of the chip on power up may be undetermined until a system reset may be applied. For example, an attacker may attempt to use boundary-scan technology, such as that set out in the Institute of Electrical and Electronics Engineers (IEEE) standard 1149.1, also referred to as joint test action group (JTAG), pins without resetting a test access point (TAP) controller or the rest of the device and thus potentially gain access to protected information such as a hardware (HW) key.

In various embodiments of the present invention, a security-sensitive feature of the secure debug module 86 may be its mode controller private instructions 86a that may allow such features as full-chip scans, mDSP and applications DSP debug 86b, including an in-silicon debug system (ISDS), and other features. Another feature may be the test interface controller (TIC) 86c that may provide direct bus master access to the main modem bus from outside pins. Yet another feature may be the modem processor debug accessibility via JTAG pins and debug trace pins 86d. Still another feature may support the ability to provision HW key fuses and security control fuses 86e.

In operation, the secure debug module 86 may include on-chip NV memory (e-fuse) that may be utilized to provide HW control over security sensitive debug functions. Each such function may be assigned a dedicated NV memory bit (fuse). Until the fuse is blown, the function may remain available. Once the fuse is blown, the function may become disabled. Thus, customers could receive chips having all fuses initiated to match the customer's place in the trust model. At boot time, the availability of all debug features may be determined by the state of the corresponding fuses.

Memory-mapped registers may be used to allow trusted software to override fuse-values and to selectively re-enable desired debug functions. Examples of the advantage of this mechanism include a scenario wherein a customer may receive special signed copy of the operational software image from a chip manufacturer and may download it to the device. The mechanism provides for a software expiration date after which time the device will refuse to execute the special software and at the next boot it will revert to the original secure debug settings as specified by the device's fuse values.

The software-based approach to override device secure debug settings may be appropriate for customer environments because the customer will conduct device debug sessions with the device in a mobile telephone or a related system. Thus, the customers are not affected by the requirement that devices may boot before the debug session may begin. The mechanism may also be sufficiently secure to be used on customer premises; i.e., if the expiration date or HW key are not expired or compromised, then debug functions are re-enabled selectively.

An iterative mechanism may be required to restore full debug functionality in devices returned to the original chip manufacturer for return material authorization (RMA) testing. The mechanism does not have to have the security features of the software-based approach, but may allow all debug functions to be restored in the device without booting up. This mechanism is described below.

A device returned to an original chip manufacturer for RMA may be initially placed on a development system board, where it will boot with special signed version of operational software. The only purpose of this software may be to output the value of the device's hardware key 52. This step may be done only once for each RMA chip. After this step is completed, the chip can be moved to the tester system. After tester power up, only a scan in the first 32 bits of the hardware key 52 value may be required to enable full debug functionality. The requirement to scan in the hardware key 52 before executing the rest of the tests may be viewed as an acceptable modification of the existing test procedures. Note that the key may be scanned in only after each full-chip reset and not after each TAP Controller reset.

A special mechanism may be implemented that ensures that the logic responsible for sensing the state of the fuses and the logic responsible for overriding fuse values may be properly initiated before any security-sensitive debug functions may be accessed. This mechanism may require a scan in of a 32-bit, non-secret constant value prior attempting to use security-sensitive debug features, for example. Device hardware may utilize this extra step to ensure that all critical logic may be in a known state before access to debug functions may be granted.

Usage scenarios for the secure debug module 86 include the following: at power up a user has access only to TAP controller public instructions and to secure debug enable (SDE) JTAG chain. At this state, the user has no access to any debug features and cannot provision the HW key and security fuses. The user may choose to enter test mode immediately or to let the device boot completely first. If the test mode is entered immediately, the following actions may take place: first, the user scans in the 32-bit non-secret value followed by 32 zero bits using device TAP controller SDE instruction. This enables all debug features and fuse-provisioning capabilities for which the corresponding fuses were not blown. Alternatively, the user may scan in the 32-bit non-secret value followed by the first 32 bits of the device's HW key using DEVICE TAP controller SDE instructions. This enables all debug features and fuse-provisioning capabilities regardless of the fuse values. After performing either one of the above steps, the user may utilize whatever debug features are enabled.

In another scenario, if the chip is permitted to boot completely then trusted software may always initiate all of the fuse-override registers to the desired values. In this case, the user may utilize whatever debug features are enabled by software and may not be required to enter any value via an SDE chain.

Secure File System Module

The secure file system module 90 may relate to M-Commerce and DRM applications, in so much that such applications may require long-term storage of user and device identity information in external, non-volatile memory (NV memory). Such information may have to be encrypted for FIPS L2 compliance. Trusted software typically encrypts sensitive data before storing it in external NV memory using device-specific hardware keys. This mechanism may be referred to as the secure file system. Having the device-specific hardware key 52 may prevent widespread security compromises in so much that if a key is compromised, a security lapse of only one device results, rather than a security lapse of all similar devices ever manufactured.

Various embodiments of the present invention may utilize security hardware 90a to implement the hardware key 52 to facilitate the SFS. Various embodiments also implement a cryptography engine 90b and DMA controller blocks 90c used to accelerate encoding and decoding of data stored in an SFS.

The hardware key 52 may be stored in on-chip NV memory (e-Fuses) and may be 256-bits long, for example. Only trusted software may read the value of the hardware key 52 by addressing hardware key registers in Secure Mode Control module memory map. Software may not store the hardware key 52 in any memory except IRAM, where a secure partition may exist at all times while the hardware key 52 is held there.

To ensure that a provisioned hardware key cannot be altered by blowing the remaining hardware key fuses, a disabling fuse 90d may be utilized. When the disabling fuse is blown, the programming functionality for the hardware key fuses may be disabled.

Trusted Time Source Module

The trusted time source module 94 may be utilized to timely expire DRM content certificates and temporary debugging right certificates. The latter may be used to temporarily grant specific user system debugging capabilities, which go beyond the capabilities specified by trust model for this user. While the trusted time source may under certain conditions fall behind real network time, the trusted time source module 94 ensures that the system time will always advance and can never be reset to any past value or otherwise compromised by unauthorized user by means of software-based or physical attack.

Trusted time source implementation does not require any additional security hardware. It may be made possible by memory protection and SFS security features. In various embodiments, the trusted time source module 94 implementation consists of the following three modules: first, keeping a local time reference 94a while a network time source may be not available. For example, the mobile telephone keeps local time utilizing a Sleep Controller hardware circuit (timer) that may be active in all power-regimes as long as the phone is turned on. The second module comprises periodically saving and restoring time in external NV memory 94b to prevent local time from been reset to zero when the power is turned off. The third module comprises synchronizing local time 94c with the source of network time when possible.

In various embodiments, a Sleep Controller sleep_xtal_timetic circuit may be utilized to keep the local time reference. The sleep_xtal_timetic may be essentially a 32-bit counter which may be initialized to zero at modem subsystem reset and then runs continuously without ever being reset. It runs off of, for example, either a 32 MHz sleep_xtal clock or a TCXO/512 clock depending on software selection. A processor MMU (shown in FIG. 1 as 98) may set one of the sleep controller registers to a specific value and when sleep_xtal_timetic reaches this value it generates sleep_xtal_timetic_int interrupt to modem processor. This logic uses always-on power regime. If sleep_xtal_timetic_int interrupt may be received when the modem processor 64 may be in sleep mode, it will cause modem processor to wake up.

Modem processor software configures a desired frequency of sleep_xtal_timetic_int interrupts. Each time the interrupt is received, the software increments a local time reference variable. Note that the local time reference only exists in the software and thus may be of any width.

If the network time is available, the software periodically synchronizes the local time with network time. Note that that when synchronization takes place nothing special needs to be done with the sleep_xtal_timetic counter.

To avoid a local time reference variable from being reset when the phone power is turned off, the software may periodically save the variable value to NV memory. The variable may be saved frequently enough so that if the phone is turned off, often the phone time still advances even in the absence of network time source. On the other hand, if saved too often, it may degrade NV memory prematurely. In devices capable of taking 100,000 writes, for example, and the lifetime of the device is three years, real time can be saved every five minutes. If that is too infrequent, software can easily implement a round robin function where the save location moves through an 8-entry circular buffer or a 16-entry circular buffer. In this case, the save frequency can be approximately every 40 seconds or approximately every 20 seconds, which should be adequate.

CDMA provides a source of trusted network time by periodically broadcasting it via a paging channel. Neither GSM nor wideband code division multiple access (WCDMA) has this feature. Another alternative may be to use global positioning satellite (GPS), but some mobile telephones do not implement a GPS receive chain. Therefore, in the case of GSM/WCDMA and no GPS, there would be no network time source. In GSM/WCDMA environments, it may be possible to create an application level system time by, for example, sending the current time trough an SMS or sending a query to an internet protocol (IP) responder that provides the current coordinated universal time (UTC) time. These options, however, may fall outside of $3^{rd}$ Generation Partners Project (3GPP) standards.

Trusted Boot Module

The trusted boot module 88 may utilize strong cryptographic protocols to guarantee that a software image loaded during boot may be the authentic image of the supplier or its partners. The trusted boot module 88 may be necessary to ensure L2 FIPS compliance.

The trusted boot module 88 may be implemented in modem processor software 88a. Further, the trusted boot module 88 may be implemented in various embodiments of the present invention as the following components: boot ROM 88b to hold primary boot loader code; memory protection 88c of the external NV memory area where the rest of the boot code may be stored to ensure that the chip is not permanently disabled by corruption of the content of this memory by malicious software, as previously discussed; a software-readable register 88d that specifies the desired boot mode; i.e., how the modem processor 64 should boot (from which off-chip NV memory and whether trusted boot protocol should be utilized or not); a pair of input pins 88e that allow the user to choose which boot mode should be used; and an on-chip NV memory bit 88f (e-Fuse) that once blown prevents the user from choosing boot modes the do not utilize the trusted boot module 88.

Various embodiments may also include cryptography engine 88g and DMA controller blocks 88h that are used to accelerate the hashing of the boot image, generally preformed during a trusted boot.

On-Chip Memory Module(s)

Cryptographic algorithms underlie many security features of embodiments of the present invention. When these algorithms are executed by software or hardware, secret information (such as cryptographic keys) has to be dynamically stored in memory. To insure FIPS L2 compliance, various embodiments of the present invention provide on-chip memory module(s) 92, such as embedded memory, to be utilized for cryptographic algorithm computations and other functions. The embedded memory may include, for example, boot ROM 92a, boot RAM 92b, and modem processor secure scratch pad memory 92c.

Boot ROM 92a holds modem processor primary boot loader code and may be 64 KB in size. Boot ROM 92a implements the slave BUS interface and may be connected to the modem.

Boot RAM 92b holds application OS trusted code for the application processor warm boot and may be 4 KB in size. Boot RAM 92b implements the slave BUS interface and may be connected to the peripheral bus.

Modem processor secure scratch pad memory 92c may be 16 KB memory that has multiple applications, some of which security related. The modem processor may utilize IRAM to perform secure computations involving long-term keys (device key or a user's private key). IRAM implements slave BUS interface and may be connected to the modem bus.

Special Security Topics

Applications DSP 72 may run multitasking RTOS 70 that may be trusted and might always run in privileged mode. The DSP 72 may execute applications using up to, for example, 32 user mode execution threads. Some applications are not trusted.

The DSP 72 implements an MMU that protects RTOS 70 and applications from accessing each other's memory spaces. However, the MMU might only protect DSP internal memory and only from DSP itself.

DSP 72 may implement a simple, hardwired MPU which divides the entire memory space mapped to several partitions. One half (32-48 KB, for example) may only be accessible when DSP 72 is in privileged mode while the other (48-64 KB, for example) may always be accessible.

Figure 3:
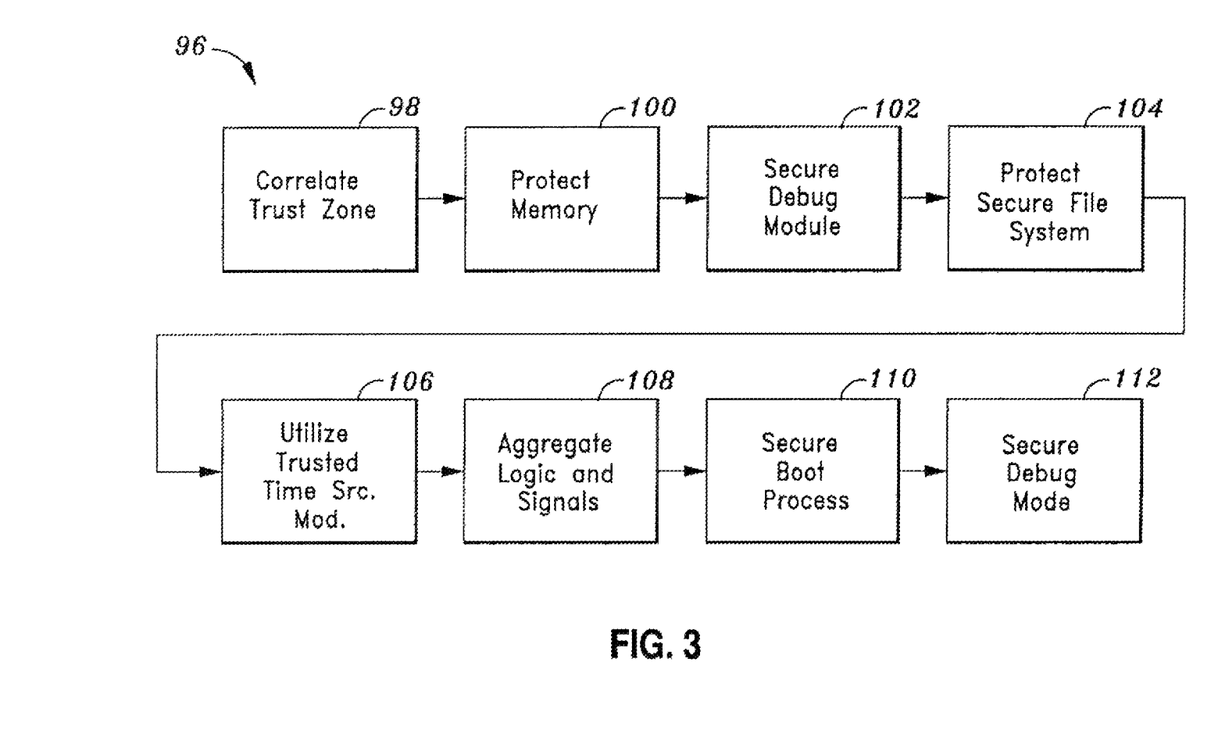
FIG. 3 illustrates a method for securing a communications device, according to an embodiment of the present invention.

With reference now to FIG. 3, and with continuing reference to FIGS. 1 and 2, there is shown generally at 94 a security method for a communications device having components including layered memory (refer to FIG. 1), a debug module, and a file system, the method 50 comprising steps of: correlating at least one trust zone 12-20 to a portion of layered memory at step 96; protecting memory via a memory protection module 84 at step 98; ensuring the security of the debug module via a secure debug module 86 at step 100; protecting the secure file system via a secure file system module 90 at step 102; protecting the communications device via a trusted time source module 94 at step 104; and aggregating logic and signals for securing boot mode at steps 106, 108, and secure debug mode via a secure debug module 86 at step 110.

It should be understood, of course, that the foregoing relates to preferred embodiments of the invention and that modifications may be made without departing from the spirit and scope of the invention as set forth in the following claims.

I claim:

1. A security system for a mobile device having a plurality of components including a secure file system, the security system comprising:
a plurality of modules, each module in the plurality of modules securing at least one component in the plurality of components, the plurality of modules including a secure file system module for protecting the secure file system;
the secure file system module including a mobile device-specific hardware key;
an on-chip, non-volatile memory having hardware key fuses for storing the mobile device-specific hardware key; and
the secure file system module further including a disabling fuse that, when blown, disables the programming functionality for the hardware key fuses.

2. The security system of claim 1, wherein the plurality of components further comprises memory and a debug module.

3. The security system of claim 2, wherein the plurality of modules further comprise:
a memory protection module for protecting memory;
a secure debug module for ensuring security of the debug module; and
a trusted time source module for protecting at least one component in the plurality of components.

4. The security system of claim 2, wherein the memory protection module further comprises at least one element selected from a group consisting essentially of a predetermined number of main memory protection unit blocks; modem processor memory management unit; a modem subsystem secure mode multiplexer block; an application digital signal processor memory protection unit; direct memory access controller security features; and general purpose input/output expansion interface security features.

5. The security system of claim 4, wherein the main memory memory protection unit blocks further comprise at least one element selected from a group consisting essentially of a first memory protection unit; a second memory protection unit; a peripheral memory protection unit; and a NAND memory protection unit.

6. The security system of claim 4, wherein the peripheral memory protection unit further comprises at least one element selected from a group consisting essentially of security violation indication; configuration registers and status registers; security identification sideband signal receipt.

7. The security system of claim 2, wherein the NAND memory protection unit further comprises at least one element selected from group consisting essentially of NAND flash memory page protection; configuration registers; and status registers.

8. The security system of claim 4, wherein the direct memory access controller security features further comprise at least one element selected from a group consisting essentially of an embedded memory protection unit; at least one shadow register; and a security identification.

9. The security system of claim 4, wherein the general purpose input/output expansion interface security features further comprise at least one element selected from a group consisting essentially of at least one shadow register and at least one bitmask.

10. The security system of claim 3, wherein the memory protection module further comprises at least one element selected from a group consisting essentially of main memory; peripheral memory and flash memory.

11. The security system of claim 10, wherein main memory further comprises at least one main memory partition selected from a group consisting essentially of a distributed mass storage system partition; a distributed mass storage system externalized state partition; at least one video frame buffer partition; at least one partition; and at least one application digital signal processor partition.

12. The security system of claim 10, wherein peripheral memory further comprises at least one peripheral memory partition selected from a group consisting essentially of a direct memory access controller secure peripheral partition; a non-direct memory access controller secure peripheral partition; a general purpose input/output expansion interface shadow registers partition; at least one direct memory access controller shadow register partition; and at least one application digital signal processor partition.

13. The security system of claim 12, wherein flash memory further comprises at least one partition selected from a group consisting essentially of a distributed mass storage system partition and a read-only third party operating system partition.

14. The security system of claim 3, wherein the secure debug module further comprises at least one element selected from a group consisting essentially of modem supervisory mode controller private instructions; a test interface controller; modem automated resource manager debug; and provision of hardware key fuses and security control fuses.

15. The security system of claim 3, wherein the secure debug module further comprises at least one element selected from a group consisting essentially of an modem supervisory mode terminal access point controller; a modem automated resource manager; a test interface controller multiplexer; and a joint test action group mode multiplexer.

16. The security system of claim 15, wherein the modem automated resource manager further comprises a single input pin for controlling access to debug capabilities.

17. The system of claim 15, wherein the joint test action group mode multiplexer further comprises access capabilities to the modem supervisory mode; the modem automated resource manager; an application automated resource manager or a combination thereof.

18. The security system of claim 3, wherein the secure file system module further comprises a cryptography engine block and a direct memory access controller block.

19. The security system of claim 3, wherein the trusted time source module further comprises modules selected from a group consisting essentially of a module for keeping a local time reference while network time sources are unavailable; a module for periodically saving and restoring time in external, non-volatile memory; and a module for synchronizing a local time with a source of network time.

20. The security system of claim 19, wherein the module for keeping a local time reference further comprises a sleep controller circuit.

21. The security system of claim 20, wherein the sleep control circuit further comprises a timer.

22. The security system of claim 19, wherein the source of network time further comprises an element selected from a group consisting essentially of code division multiple access and global positioning satellite.

23. The security system of claim 3, further comprising a security mode control module having at least one register selected from a group consisting essentially of a boot mode register; a first debug register; a second debug register; a first hardware register; and a second hardware register.

24. The security system of claim 23, wherein the first debug register further comprises a terminal access point control register.

25. The security system of claim 23, wherein the second debug register further comprises a debug control register.

26. The security system of claim 23, wherein the first hardware register further comprises a hardware key register.

27. The security system of claim 23, wherein the second hardware register further comprises a secure debug enable chain register.

* * * * *